No. 685,352.　　　　　　　　　　　　　　　Patented Oct. 29, 1901.
W. A. SCHUNICHT.
ONION HARVESTER.
(Application filed May 27, 1901.)
(No Model.)
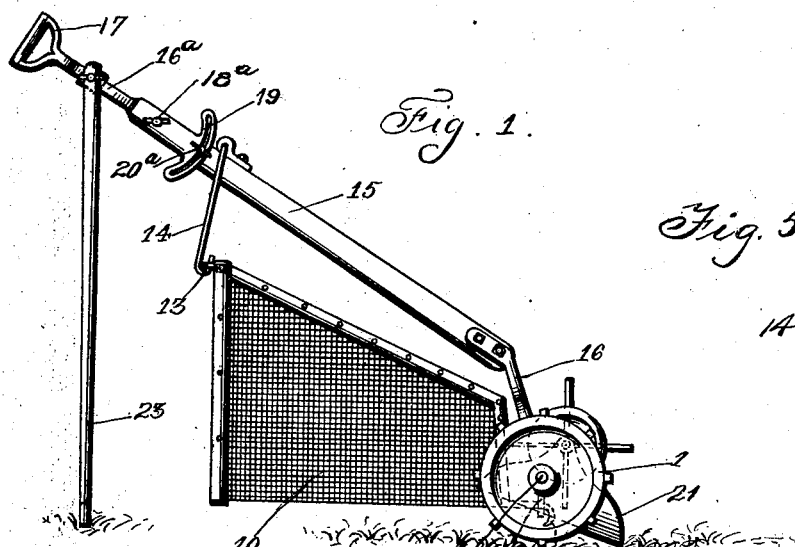
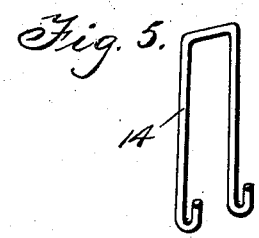
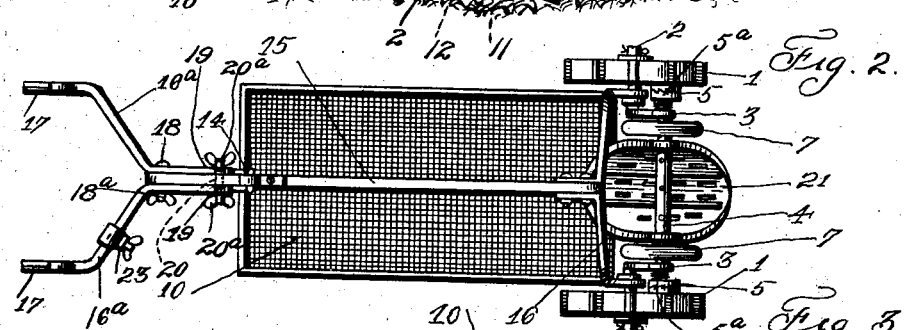
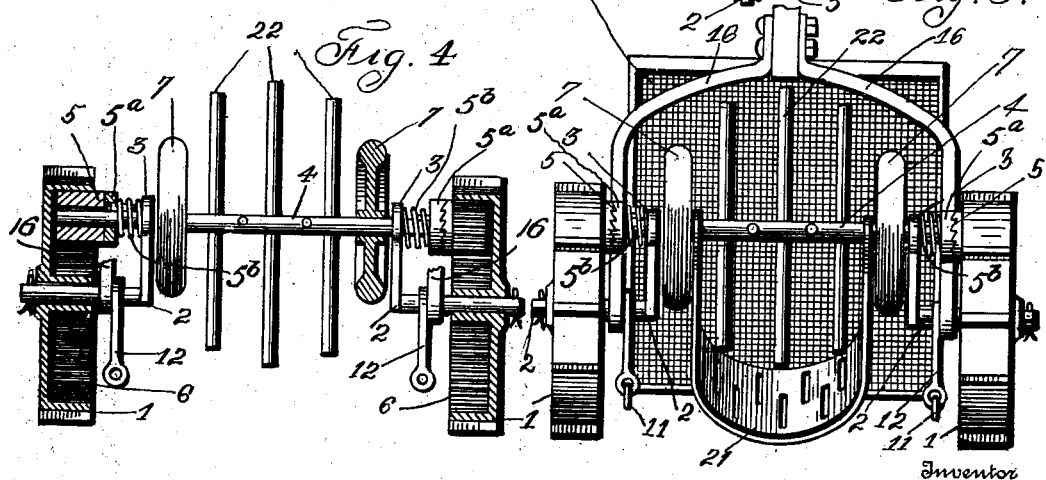
Witnesses　　　　　　　　Inventor
W. A. Schunicht
By H. B. Willson & Co.
Attorneys

UNITED STATES PATENT OFFICE.

WILLIAM A. SCHUNICHT, OF LOUISVILLE, KENTUCKY.

ONION-HARVESTER.

SPECIFICATION forming part of Letters Patent No. 685,352, dated October 29, 1901.

Application filed May 27, 1901. Serial No. 62,066. (No model.)

*To all whom it may concern:*

Be it known that I, WILLIAM A. SCHUNICHT, a citizen of the United States, residing at Louisville, in the county of Jefferson and State of Kentucky, have invented certain new and useful Improvements in Onion-Harvesters; and I do declare the following to be a full, clear, and exact description of the invention, such as will enable others skilled in the art to which it appertains to make and use the same.

This invention relates to a device for harvesting onions and other like plants set out in rows and close to the ground surface.

The object of the invention is to provide a device of this character which is simple in construction, efficient in operation, and may be cheaply manufactured.

With this and other objects in view the invention consists of certain novel features of construction, combination, and arrangement of parts, as will be hereinafter more fully described, and particularly pointed out in the appended claim.

In the accompanying drawings, Figure 1 is a side elevation of an onion-harvester embodying my invention. Fig. 2 is a top plan view of the same. Fig. 3 is a front elevation, and Fig. 4 is a sectional view through the gearing on the line of the operating-shaft. Fig. 5 is a detail view of the hanger 14.

Referring now more particularly to the drawings, the numeral 1 represents the driving and supporting wheels, which are preferably spurred or stepped to obtain a firm hold upon the ground. These wheels are loosely mounted upon stub-axles 2, carrying angular brackets 3, having journaled therein an operating-shaft 4. This shaft 4 carries loose clutch-pinions 5, which mesh with gear-teeth 6 upon the internal circumferences of the wheels 1 and are formed with ratchet-teeth for engagement with ratchet-toothed feathered sliding sleeves 5ª, which are normally held in engagement with the pinions by springs 5ᵇ, whereby said pinions are fixed to the shaft to communicate motion thereto from the wheels 1. The clutch connection of the pinions with the shaft provides a backing-ratchet, which adapts the pinions to rotate with the shaft when the harvester is pushed forwardly, but allows said pinions to rotate loosely on the shaft when the harvester is moved backwardly to prevent the backward operation of the shaft and fingers, hereinafter described.

7 represents fly-wheels mounted upon the shaft 4 to secure an easy and continuous operation of said shaft while the harvester is in motion.

10 represents a basket or receptacle preferably composed of wire-netting secured to a suitable frame. This basket is provided at its front end with hooks or engaging members 11 for attachment to hangers 12, pendent from the said stub-axles 2. At its rear end the basket is provided at its upper edge with a loop or eye 13 to receive hooks upon the lower end of a hanger 14, swiveled upon the beam or handle 15. This beam or handle is provided at its forward end with arms 16, which diverge and project downwardly and are suitably connected to the stub-axles 2. By this manner of connecting the basket said basket is adapted to be readily applied and removed. To the upper rear end of the beam 15 are connected divergent handle-bars 16ª, which terminate at their outer ends in hand grips or loops 17. These bars are pivoted on opposite sides of the beam 15 upon a bolt 18, passed through said beam and threaded at one end to receive a wing-nut 18ª and are provided at their inner ends with slotted segmental plates 19, through which and the beam projects a bolt 20, threaded at both ends to receive wing-nuts 20ª. By this construction the bars 16ª are adapted to pivot upon the bolt 18 and to be adjustably secured by the wing-nuts 20ª, clamping the slotted segmental plates 19, whereby said bolts 16ª may be turned on the pivot 18 to raise or lower the handholds or grips to a convenient position for use. The forward end of the basket is open and receives the rear end of a scoop or shovel 21, which is mounted upon a shaft 4 and serves as a digger, whereby the onions are dug up and brought to the surface. This scoop, shovel, or digger is preferably made of foraminous or reticulated material, so as to allow the dirt taken up by the onions to pass through and the clean onions to pass therefrom into the basket.

22 represents a series of radial fingers or rake-pins mounted upon the shaft 4 and serving when the same is revolved to shake up the onions and remove the dirt therefrom and to feed the onions rearwardly from the digger into the basket in rear thereof.

23 represents a stand or support having a hinged clamping connection with one of the handle-bars 16ª and adapted to be thrown down when required to rest upon the surface of the ground and temporarily support the rear end of the harvester.

In operation the harvester is pushed forward by the operator and the shovel penetrates the earth and gathers up the onions, which are fed backward into the basket by the fingers or rake-teeth 22. When the basket is filled to the desired extent, it may be removed by detaching it from its supporting-plates at the front and the hanger 14 at the rear to dump the onions and then as conveniently replaced.

From the foregoing description, taken in connection with the accompanying drawings, the construction, mode of operation, and advantages of the invention will be readily understood, and it will be seen that the invention provides a harvester device which is simple in construction, convenient and efficient in operation, and adapted to be manufactured at small cost.

The device may be used for harvesting all plants or vegetables of the kind set out in rows and growing near the surface.

Having thus fully described my invention, what I claim, and desire to secure by Letters Patent, is—

In an onion-harvester, the combination of stub-axles provided with bearing-brackets, an operating-shaft journaled in said bearing-brackets, drive and supporting wheels journaled upon the stub-axles and provided with internal gears, clutch-pinions upon said shaft and meshing with said internal gears, said pinions having a backing-ratchet connection with the shaft, a beam provided with handles and connected with said axles, a basket suspended from the beam and axles, a digger consisting of a scoop mounted upon the shaft adjacent to the mouth of the basket, and rake-teeth carried by the shaft and acting to sweep the onions from said digger back into the basket, substantially as described.

In testimony whereof I have hereunto set my hand in presence of two subscribing witnesses.

WILLIAM A. SCHUNICHT.

Witnesses:
FRED F. HOLZKNECHT,
JOHN WM. ADAMS.